US Patent [19] Chiao

[11] 4,243,577
[45] Jan. 6, 1981

[54] MODIFIED THERMOPLASTIC RESINS
[75] Inventor: Cherry C. Chiao, San Ramon, Calif.
[73] Assignee: The Dow Chemical Company, Midland, Mich.
[21] Appl. No.: 49,701
[22] Filed: Jun. 18, 1979

Related U.S. Application Data
[63] Continuation-in-part of Ser. No. 942,094, Sep. 13, 1978, abandoned.
[51] Int. Cl.$^3$ ................................................ C08K 3/04
[52] U.S. Cl. ............................. 260/42.47; 260/42.48
[58] Field of Search ............................ 260/42.47, 42.48

[56] References Cited
U.S. PATENT DOCUMENTS

| | | | |
|---|---|---|---|
| 2,656,324 | 10/1953 | Te Grotenhuis | 260/5 |
| 3,010,936 | 11/1961 | Irvin | 525/77 |
| 3,103,498 | 9/1963 | Scriba et al. | 525/218 |
| 3,111,501 | 11/1963 | Thompson | 260/42.43 |
| 3,113,119 | 12/1963 | Forrester | 260/42.47 |
| 3,203,922 | 8/1965 | Hanmer | 260/42.54 |
| 3,270,777 | 9/1966 | Thompson | 138/118 |
| 3,352,820 | 11/1967 | Bawn | 260/876 R |
| 3,624,189 | 11/1971 | Goldman | 260/894 |
| 3,851,014 | 11/1974 | Dalton | 525/86 |
| 4,060,070 | 11/1977 | Harter | 126/447 |

Primary Examiner—Lewis T. Jacobs

[57] ABSTRACT

The present invention relates to high impact strength polymeric compositions comprising acrylonitrile-butadiene-styrene terpolymers, carbon black and a nitrile rubber additive. The presence of the rubber additive restores the impact strength of the acrylonitrile-butadiene-styrene compositions, which is normally substantially degraded by the addition of carbon black.

9 Claims, No Drawings

MODIFIED THERMOPLASTIC RESINS

CROSS-REFERENCE TO RELATED APPLICATION

This application is a continuation-in-part of my copending application Ser. No. 942,094, filed Sept. 13, 1978, now abandoned.

BACKGROUND OF THE INVENTION

The invention relates to new and improved high impact strength resin compositions having physical properties which make the same valuable for applications where toughness and high impact strength are required, such as in plastic pipe.

ABS, i.e., acrylonitrile-butadiene-styrene terpolymer and similar related compositions are well known in the art. Where these and related compositions are used for certain applications, such as making plastic pipe or other articles which might be exposed to ultraviolet light sources, carbon black is usually incorporated therein in small amounts as a pigment for screening out ultraviolet light. However, the addition of required amounts of carbon black for this purpose usually has been found to cause severe degradation of the impact strength thereof. This is especially disadvantageous where it is desired to use ABS compositions for uses where carbon black is required, for example, to make drain, waste and vent (DWV) pipe which has certain impact strength standards for ambient (e.g., about 23° C.) temperatures, or where high impact strength at sub-zero (e.g., about −40° C.) temperatures is also desired. See ASTM D-2661 (1974). Accordingly, it is an object of this invention to provide ABS termpolymer/carbon black polymeric compositions which have high impact strength and good toughness, as determined by standard Notched Izod and Gardner drop weight tests at ambient and sub-zero temperatures.

SUMMARY OF THE INVENTION

It has been surprisingly discovered the impact strength and other desirable properties of ABS and ABS-type polymeric resins can be retained despite the addition of carbon black (said compositions being sometimes referred to herein as ABS or ABS-type/CB resins) thereto, by incorporating therein certain nitrile rubber copolymers. These nitrile rubber copolymers can advantageously be added during the preparation of the ABS resin mixture, or can be melt-blended with the ABS terpolymer before or after the carbon black (CB) addition, or can be premixed with the carbon black to form a concentrate for melt-blending with the ABS or ABS-type resin. The resulting modified polymeric compositions retain or exceed the desired high ambient impact strength of the ABS or ABS-type resin used and additionally have good low temperature impact resistance and increased overall toughness, such as determined by Gardner drop weight tests. The compositions of the present invention are thus highly useful for applications such as making plastic pipe containing CB.

DETAILED DESCRIPTION OF THE INVENTION

The invention, in its broadest form, concerns a polymeric composition comprising (a) an ABS or ABS-type terpolymer comprising an alkenyl aromatic monomer, a vinyl cyanide monomer and a rubber monomer or rubber-containing copolymer, (b) carbon black, and (c) a sufficient amount of a butadiene-acrylonitrile copolymer rubber to substantially minimize the detrimental effect of carbon black on the impact strength of (a). In a highly preferred embodiment, the invention concerns polymeric compositions which comprise (a) an acrylonitrile-butadiene-styrene terpolymer, e.g., ABS resin, (b) carbon black, and (c) a butadiene-acrylonitrile copolymer rubber in a sufficient amount to substantially minimize the detrimental effect of carbon black on the impact strength of (a). The term "substantially minimize" means that the impact strength (hereinafter to be construed as determined by the standard Notched Izod or drop-weight type Impact Strength (ft-lb/inch) at 73° C. of the polymeric composition is about equal to or greater than the impact strength of the terpolymer composition (a) alone. Sufficient amounts of the copolymer rubber are preferably used to provide a polymeric composition having an impact strength (at 73° F.) greater than the impact strength of the terpolymer component (a) alone under the same test conditions. Preferably, amounts of the copolymer rubber sufficient to provide from about 0.2 to about 20.0 weight % thereof of total polymeric composition are employed. In another preferred embodiment, the amount of copolymer rubber employed is sufficient to provide a polymeric composition characterized by high impact strengths at ambient and sub-zero temperatures. In a further embodiment, a polymeric composition having sufficient amounts of copolymer rubber to provide impact strengths about the same as or greater than the impact strengths of component (a) at 73° F. and −40° F. temperatures is preferred. In still another embodiment, the polymeric compositions of the present invention are preferably melt blends of a component (a) terpolymer with the carbon black and nitrile rubber components (b) and (c), components (b) and (c) further being preferably employed together in a concentrate form.

By the term "alkenyl aromatic monomer" is meant an alkenyl aromatic compound having the general formula

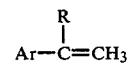

wherein Ar represents an aromatic hydrocarbon radical, or an aromatic halohydrocarbon radical of the benzene series, and R is hydrogen or the methyl radical. Examples of such alkenyl aromatic monomers are styrene, α-methylstyrene, o-methylstyrene, m-methylstyrene, p-methylstyrene, ar-ethylstyrene, ar-vinylxylene, ar-chlorostyrene or ar-bromostyrene and the like. Beneficially, such monomers are employed in an amount up to about 75 weight percent of the total terpolymer composition (a), and advantageously from about 50 to 60 weight percent of the terpolymer composition.

Suitable vinyl cyanide monomers include methacrylonitrile, acrylonitrile and the like, which are usually employed in amounts of from about 15 to about 30 wt. % of the total terpolymer composition (a).

The rubber can be one or more conjugated diene, e.g., 1,3-butadiene, isoprene, piperylene, chloroprene, etc., including homopolymers and interpolymers thereof. The rubber can also comprise up to an equal amount by weight of one or more copolymerizable monoethylenically unsaturated monomers, such as monovinylidene aromatic hydrocarbons (e.g., styrene;

an aralkylstyrene, such as the o-, m- and p-methylstyrenes, 2,4-dimethylstyrene, the ar-ethylstyrenes, p-tert-butyl-styrene, etc.; an α-alkylstyrene, such as α-methylstyrene, α-ethylstyrene, α-methyl-p-methylstyrene, etc.; vinyl naphthalene, etc.) ar-halo monovinylidene aromatic hydrocarbons (e.g., the o-, m- and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); α-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Numerous ABS resins which can be used as component (a) herein are made by a variety of processes and are commercially available. These generally comprise from about 6 to about 30 wt. % total rubber; from about 15 to about 30 wt. % acrylonitrile, from about 0.5 to about 1.5 wt. % additives, (e.g., anti-oxidants, stabilizers, and the like), the balance being styrene. As hereinafter referred to, the phrase "the balance being essentially styrene" is understood to be inclusive of the amounts of typically employed additives. Preferably, component (a) comprises from about 6 to about 20 wt. % total rubber, from about 17 to about 25 wt. % acrylonitrile, the balance being essentially styrene and small amounts of additives. A preferred component (a) comprises approximately about 12 to about 20 wt. % total rubber, about 20–25 wt. % acrylonitrile, the balance being styrene and small amounts of typical additives.

The rubber copolymer component (c) likewise may be any conventional rubbery copolymer containing, for example, from about 20 to about 50 or more % by weight acrylonitrile and correspondingly from about 80 to about 50 or less wt. % of butadiene, with small amounts of typical additives, which is effective to at least substantially minimize the detrimental effect of carbon black on the impact strength of component (a). Representative examples of such rubbery copolymers include those known in the trade, such as the Hycar series, e.g., −1432, 1034–60, etc., as described in a 1976 Bulletin E-2, Manual HM-1 (revised) by the B. F. Goodrich Chemical Co., Chemigum nitrile rubbers, e.g., -N318B, N715B, etc., as described in "Technical Book Facts (CG-39) on Chemigum", 1974, by the Goodyear Tire and Rubber Co., Paracril (UniRoyal Chemical Co.), FR-N (Firestone Synthetic Rubber and Latex Co.) Krynac (Polysar, Inc.) and the like.

Illustratively, Hycar 1053 is a non-crosslinked, low temperature polymerized random copolymer of about 29 wt. % acrylonitrile and about 71 wt. % butadiene. Nitrile rubbers having a nominal acrylonitrile (AN) of from about 25 to about 35 wt. % are preferred. Further preferred are the preceding compositions having an average Mooney viscosity (ML-4 @ 100° C.) of from about 30 to about 65. The rubbery copolymer may be premixed with the carbon black such as, for example, Regal 300, Regal SRF-S, Raven 1000, and the like by solution or, preferably, melt blending. The carbon black is usually employed in amounts of from about 0.2 to about 0.5 wt. % or more of the polymeric composition, depending upon the desired end use, with amounts of about 0.35 wt. % typically being used for DWV pipe applications.

Preferably, a premix concentrate (hereinafter NRBC concentrate) comprising the rubbery copolymer (about 20 to about 80, preferably about 20 to about 40% by weight), carbon black (about 2 to about 50% by weight), the balance being ABS or an ABS-type terpolymer (usually from about 10 to about 75 weight %) is employed to form the finished polymeric compositions disclosed herein and constitutes a preferred embodiment of the invention. In a particular preferred embodiment, the NRBC concentrate comprises from about 30 to about 40 weight % rubbery copolymer, the remainder being carbon black and an ABS or ABS-type resin, e.g., a terpolymer comprising an alkenyl aromatic monomer, a vinyl cyanide monomer and a rubber monomer or rubber-containing copolymer. In another preferred embodiment, the NRBC concentrate comprises from about 30 to about 35 weight % carbon black, from about 30 to about 35 weight % rubbery copolymer and about 30 to about 35 weight % ABS or ABS-type resin. Preferably, ABS is used in foregoing embodiments. A plasticizer, such as dioctyl-adipate, dioctyl-phthalate or the like can be employed, if desired, in amounts ranging from about 1 to about 6% by weight of the concentrate. In a highly preferred embodiment, the concentrate comprises about 35 weight % carbon black and about 32.5 weight % each of ABS and rubbery copolymer. While a concentrate of NR and CB alone can be prepared, the same is usually either undesirably tacky and/or tends to cross-link to a detrimental degree. Accordingly, use of ABS or an ABS-type terpolymer, preferably ABS, and amounts of rubbery copolymer ranging from about 20 to about 40 weight %, are preferred for avoiding the noted disadvantages and for preparing NRBC concentrates of the present invention; such concentrates can be used to provide ABS or ABS-type resins having impact strengths higher than would be expected when CB is incorporated therein. The ABS resin used in the concentrate preferably comprises from about 15 to about 23 weight % acrylonitrile, from about 6 to about 16 weight % total rubber, the balance being mostly stryrene (including typical additives). The rubber copolymer preferably comprises about 25–35 weight % acrylonitrile and about 65–75 wt. % butadiene. The concentrate compositions can be prepared by melt blending (by internal mixer, extruder, roll mill, etc.) although solution blending can be employed. In a melt blend process, the ingredients are mixed at an appropriate temperature, usually about 200° C. for a period of about 2 to about 3 minutes using an internal mixer, such as a Banbury mixer. Where solution blending is desired, the carbon black can be mixed using an ultrasonic bath, with a dispersant medium such as acetone, or the like and the rubber copolymer then mixed therewith. The resulting mixture can be poured onto a tray and the dispersant medium evaporated therefrom, with the residue obtained being dried in an oven.

The polymeric compositions of the present invention can be prepared by melt-blending the NRBC concentrate, or a carbon black concentrate and rubbery copolymer (c), each as separate ingredients, with the desired component (a) terpolymer, or by adding the nitrile rubber during mass polymerization preparation of the component (a) terpolymer, and melt blending the resulting composition with the carbon black. Sufficient amounts of the concentrate or of the separate ingredients thereof are used to provide a desired concentration of the carbon black and rubber copolymer in the finished polymeric composition. While ranges for the rubber copolymer and carbon black have been previously noted, those skilled in the art will recognize the amount of each to be employed will vary depending upon the particular end use desired, the NR or CB being employed, etc. The amount needed for any particular application can, however, be readily determined by simple experimental evaluation according to the teachings of the specification and the examples given herein. In a preferred embodiment, about one part by weight of an NRBC concentrate comprising about 30–35% each of carbon black, nitrile rubber copolymer and ABS resin is melt-blended with about 99 parts by weight of the component (a) terpolymer to form a preferred polymeric composition.

In what is believed to be the best mode presently known for preparing the polymeric products of the present invention, an NRBC premix concentrate is melt-blended with the component (a) terpolymer by extruding (2 passes) the premix and component (a) at about 193° C. using a screw speed setting of about 40 or more rpm for a two-stage ¾" single screw Killion extruder (L/D=20/1) or corresponding screw speed for other extruders employed. It has also been found that components (a) and (c) can be melt-blended in a twin-screw extruder (0.8" Welding Engineer's) using a single extrusion pass, optimum results being obtained using a high shear screw arrangement, high screw speed, and lowest possible barrel temperature.

Where it is desired to incorporate the nitrile rubber component (c) directly into component (a) during preparation of (a), the same can be done provided the process for preparing component (a) is a mass polymerization process. The resulting product can then be melt blended with the carbon black. However, it is to be understood that, where component (a) is to be melt-blended with components (b) and (c) separately or with (b) and (c) as a premix, the component (a) source is not limited by any particular method used to prepare the same. Thus, where it is desired to add the nitrile rubber during the mass polymerization preparation of ABS component (a), it is believed the best mode presently known for accomplishing the same comprises introducing the nitrile rubber component with a second feed stream of diluent and additional monomers to the second stage of a typical 3-stage mass polymerization reactor system. This particular method appears desirable as phase inversion of the base rubber monomer does not appear to be delayed, and may be accelerated by the addition of the nitrile rubber, which is incompatible with the base rubber of the ABS resin. While it is not desired to limit this aspect of the invention to any particular theory of operation, it appears that the rubbery copolymer (b) causes a reduction in the final rubber particle size of the finished resin, and also enters into some type of bond with the carbon black particles. Such bonding may result in an overall stronger association of the carbon black with the styrene-acrylonitrile matrix phase of the component (a) resin.

EXAMPLE 1

Carbon black and carbon black-nitrile rubber concentrates can typically be prepared by solution blending or by melt-blending procedures. In an illustrative melt-blending procedure, the carbon black, nitrile rubber (e.g., Hycar 1053) and an ABS resin, are melt-blended at about 201°–204° C. for about 1–3 minutes in a conventional Banbury mixer. 200 ppm of polyglycol E400 were added to each concentrate before packaging. In other procedures where only a CB concentrate (no NR) is desired, the same can be prepared by milling the carbon black with an ABS-type resin (using a two-roll mill) to first obtain an even dispersion of the carbon black, then melt-blending the composition in a Banbury mixer. The various carbon black (SBC or EBC) or nitrile rubber-carbon black (NRBC) concentrates prepared by the above or other known procedures were as follows (all % are by weight):

| Reference Code | % Carbon Black | % Nitrile Rubber | % ABS[a] Resin |
|---|---|---|---|
| 1. SBC #1[b] | 35.0 | 0 | 59.0 |
| 2. SBC #2 | " | " | " |
| 3. EBC #1 | " | " | " |
| 4. EBC #2 | " | " | " |
| 5. NRBC #1 | 5.0 | 72.0[c] | 23.0 |
| 6. NRBC #2 | 7.0 | 70.0 | " |
| 7. NRBC #3 | 35.0 | 32.5 | 32.5 |

[a]ABS resin = nominally 17% acrylonitrile, 7% butadiene, balance styrene.
[b]Samples 1–4 all contain about 6% dioctylphthalate plasticizer; Regal 300 Carbon Black used in Samples 1–2, Regal SRF-S Carbon Black used in Samples 3–8.
[c]The nitrile rubber in Samples 5–7 was 29% acrylonitrile, 71% butadiene (Hycar 1053); Hycar 1453 (crumb form of 1053) used in Sample No. 7.

EXAMPLE 2

The concentrates of Example 1 above were then melt-blended by extrusion with ABS thermoplastic resins as component (a) of the compositions of the invention, sufficient amounts of the concentrates being employed to provide 0.35 wt. % of carbon black in the final thermoplastic composition (0.35 wt. % carbon black being the amount typically used to protect DWV pipe against UV degradation). Thus, for example, 1 part of NRBC #3 per 99 parts of ABS is utilized to provide 0.35 wt. % in the melt-blended composition. Specimens of the prepared compositions were then molded for impact testing.

MELT BLENDING

A small two-stage ¾" single screw Killion extruder (L/D=20/1) was used for all extrusions. The extruder was equipped with a cooling water through and a pellet cutter. The materials were hand-mixed and dried at around 60° C. in a vacuum oven before and after each extrusion. The extrusion conditions were as follows:
  Barrel temperature: 380° F. (193° C.) (all three zones)
  Nozzle temperature: 380° F. (193° C.)
  Screw speed: 54 rpm
  Number of extrusion passes: 2.

SPECIMEN PREPARATION

All impact specimens were compression molded unless mentioned otherwise. The molding procedure is as follows:
(1) Preheat mold with sample in hot press for 10 minutes at 410° F. (210° C.).
(2) Pressure up gradually to 20 tons in 1¼ minutes.
(3) Hold at 20 tons and 210° C. for 2 minutes.
(4) Turn off heat. Cooling in place under 20 tons with cooling water to room temperature (~15 minutes).
(5) Release pressure and remove specimens from the mold.

SPECIMEN CONDITIONING AND TESTING

All 73° F. testing specimens were conditioned at 73° F. and 50% relative humidity at least overnight before testing. The −40° F. testing specimens were cooled in a freezer at −40° F. overnight before testing.

Notched Izod impact testing was conducted according to ASTM D256 Method A. An Izod tester by Testing Machines, Inc. was used. Gardner drop-weight impact tests were also conducted. Two Gardner drop-dart impact testers were used. One Gardner tester (a) consisted of a 4-lb. dart with a ½" diameter round tip, and specimen support with a ⅝" hemispherical hole in line with the dart. The other Gardner tester (b) was equipped with an 8-lb. dart (½" diameter, round top) and a specimen support with a 1¼" hole. The Bruceton staircase method (Moritz, W. J., "Fair-Sensitivity Criterion for Evaluating Falling Dart-Impact Tests", Modern Plastics, 60, Nov. 1975) was used for calculating energy at 50% failure.

The results of the various operations are set forth in the following Tables I–III. (All data are from compression molded samples, all % are by weight), and the concentrate source identified is as indicated in Example 1 above):

TABLE I

EFFECT OF CARBON BLACK ON IMPACT STRENGTH OF ABS

| Sample No. | Carbon Black % (Concentrate Source) | Notched Izod Impact[a] (Ft-Lb/In) 73° F. | −40° F. | Gardner Impact (In-Lb) 73° F. | −40° F. |
|---|---|---|---|---|---|
| 1. ABS-1[d] | 0 | 3.5 ± 0.2 | 1.8 ± 0.1 | 54[b] | 41[b] |
| 2. ABS-1 | 0.35 (SBC #1) | 2.4 ± 0.1 | 1.3 ± 0.3 | 37[b] | 27[b] |
| 3. ABS-2[e] | 0 | 7.4 ± 0.3 | 3.0 | 70[b] | 64[b] |
| 4. ABS-2 | 0.35 (SBC #1) | 5.4 ± 0.3 | 1.9 ± 0.2 | 51[b] | 36[b] |
| 5. ABS-3[f] | 0 | 6.5 ± 1.0 | 2.0 ± 0.1 | 189 ± 9[c] | 83 ± 3[c] |
| 6. ABS-3 | 0.35 (SBC #1) | 4.6 ± 0.1 | 1.8 ± 0.1 | — | — |
| 7. " | 0.35 (SBC #2) | 5.8 ± 0.5 | 1.7 ± 0.1 | 121 ± 12[c] | 65 ± 4[c] |
| 8. " | 0.35 (EBC #1) | 5.1 ± 0.2 | 1.7 ± 0.1 | — | — |
| 9. " | 0.35 (EBC #2) | 5.1 ± 0.1 | 1.7 ± 0.1 | 148 ± 7[c] | 83 ± 3[c] |

[a]Average of 5 specimens. The ± values indicate 95% confidence limits. For converting to SI unit: 1 ft-lb/in = 53.3787 J/m.
[b]Energy at 50% failure of 16 tests using the Gardner tester (a). The nominal specimen thickness is 0.075 in.
[c]Energy at 50% failure of 20 specimens (30 specimens for −40° F.) tested on Gardner tester (b). Nominal specimen size: 2" × 2" × 0.15". The ± values indicate 95% confidence limits.
[d]ABS-1 resin = nominally 23% acrylonitrile, 15% rubber, 60% styrene.
[e]ABS-2 resin = nominally 23% acrylonitrile, 17% rubber, 58% styrene.
[f]ABS-3 resin = nominally 22% acrylonitrile, 19% rubber, 57% styrene.

The detrimental effect of carbon black on the impact strength and toughness of each of the ABS resins is clearly shown in Table I. All three ABS resins decreased considerably in impact strength when 0.35% of carbon black was added. This undesirable effect on impact strength and toughness is evidenced by both notched Izod impact and Gardner drop dart impact data of the materials at both 73 and −40° F. The ABS designations in the following tables are as noted in Table I.

In Table II, SBC, EBC and NRBC compositions were evaluated with ABS-3. These results also show the same trend with ABS-3 as for ABS-1 and ABS-2, i.e., that NRBC has a remedial as well as an improved effect on the detrimental behavior of carbon black on the impact strength/toughness of ABS resins.

TABLE II

COMPARISON OF THE IMPACT STRENGTH TOUGHNESS OF ABS-3 WITH OR WITHOUT CARBON BLACK IN THE PRESENCE OR ABSENCE OF NITRILE RUBBER

| Sample No. | % Carbon Black (Concentrate Source) | % Nitrile Rubber[a] | Notched Izod Impact[b] (Ft-Lb/In) 73° F. | −40° F. | Gardner Impact[c] (In-Lb) 73° F. | −40° F. |
|---|---|---|---|---|---|---|
| 1. ABS-3 | 0 | 0 | 6.5 ± 1.0 | 2.0 ± 0.1 | 182 ± 9 | 83 ± 3 |
| 2. " | 0.35 (SBC-#1) | 0 | 5.8 ± 0.5 | 1.7 ± 0.1 | 121 ± 12 | 65 ± 4 |
| 3. " | 0.35 (EBC-#2) | 0 | 5.1 ± 0.1 | 1.7 ± 0.1 | 148 ± 7 | 83 ± 3 |
| 4. " | 0.35 (EBC-#1) | 0 | 5.1 ± 0.2 | 1.7 ± 0.1 | — | — |
| 5. " | 0.35 (NRBC-#1) | 5.04 | 8.9 ± 0.4 | 2.5 ± 0.1 | 214 ± 11 | 111 ± 6 |
| 6. " | 0.35 (NRBC-#2) | 3.50 | 8.9 ± 0.3 | 2.2 ± 0.1 | 239 ± 5 | 124 ± 6 |

[a]Nitrile Rubber = Hycar 1053.
[b]Average of 5 specimens. The ± values represent 95% confidence limits. For converting to SI unit: 1 ft-lb/in = 53.3787 J/m.
[c]Energy at 50% failure of 16 tests using Gardner tester (a). The nominal specimen thickness is 0.075".

Two ABS resins (#2 and #3) were melt-blended with either an NRBC concentrate or NR and a conventional black concentrate (SBC or EBC). Impact data show that the resulting blends from all operations are comparable in impact strength/toughness (Table III). Thus, NR minimizes the detrimental effect of carbon black on the impact strength/toughness of ABS resins (note control data for ABS-#2 and ABS-#3 in previous Tables I and II), regardless whether carbon black was added as a concentrate premix with the NR or added to the ABS resin before or after separate NR addition.

impact resin utilized in such blends could be increased without sacrificing desired impact strength properties of the blend. In these operations, a high impact resin (ABS-3) and a low impact resin ABS-4 (about 15–19%

TABLE III

COMPARISON OF THE IMPACT STRENGTH/TOUGHNESS OF ABS WITH EITHER NITRILE RUBBER CARBON BLACK CONCENTRATE OR CARBON BLACK CONCENTRATE PLUS NITRILE RUBBER

| Sample No. | % Carbon Black (Concentrate Source) | % Nitrile Rubber[a] | Notched Izod Impact[b] (Ft-Lb/In) 73° F. | −40° F. | Gardner Impact[c] (In-Lb) 73° F. | −40° F. |
|---|---|---|---|---|---|---|
| 1. ABS-#2 | 0.35 (SBC-#1) | 5 | 8.8 ± 1.1 | 3.1 ± 0.4 | 78[c] | 52[c] |
| 2. ABS-#3 | 0.35 (NRBC-#1) | 5 | 8.9 ± 0.4 | 2.5 ± 0.1 | 214 ± 11[d] | 111± 6[d] |
| 3. ABS-#3 | 0.35 (EBC-#2) | 5 | 8.9 ± 0.5 | 2.4 ± 0.1 | 251 ± 5[d] | 119 ± 4[d] |

[a]Hycar 1053, added separately in Samples 2 and 4.
[b]Average of 5 specimens. The ± values indicate 95% confidence limits. For converting to SI unit: 1 ft-lb/in = 53.3787 J/m.
[c]Energy at 50% failure of 16 tests using the old tester. The nominal specimen thickness is 0.075".
[d]Energy at 50% failure of 20 specimens (30 specimens for −40° F.) tested on the Gardner tester (b). Nominal specimen dimensions: 2" × 2" × 0.15". The ± values indicate 95% confidence limits.

EXAMPLE 3

In other operations, the butadiene-acrylonitrile rubbery copolymer additives of the present invention were evaluated in side-by-side tests with other rubber additives and samples of the compositions impact tested. As is apparent from the data set forth in Table IV below, both the Gardner and notched Izod impact strengths of the blend composition containing carbon black were restored and increased when a nitrile rubber of the present invention was employed, but were even further reduced below the control sample impact strengths when other rubber copolymer additives were employed. The data thus establish the nitrile rubbers of the present invention appear to be unique as to the restoration and improvement in toughness of ABS-type resins containing carbon black.

TABLE IV

COMPARISON OF THE IMPACT STRENGTH/TOUGHNESS OF CARBON BLACK ABS MELT-BLENDED WITH VARIOUS RUBBERS

| Sample No. | Rubber Additive % | Notched Izod Impact[a] (Ft-Lb/In) 73° F. | −40° F. | Gardner Impact[b] (In-Lb) 73° F. | −40° F. |
|---|---|---|---|---|---|
| 1. ABS-#2-SBC #1[c] | 0 | 5.4 ± 0.3 | 1.9 ± 0.2 | 51 | 36 |
| 2. ABS-#2-SBC #1[c] | 5.0[d] | 8.8 ± 1.1 | 3.1 ± 0.4 | 78 | 52 |
| 3. ABS-#2-SBC #1[c] | 5.0[e] | 2.7 ± 0.3 | 1.3 ± 0.3 | 19 | 6 |
| 4. ABS-#2-SBC #1[c] | 5.0[f] | 2.4 35 0.2 | 1.0 ± 0.1 | 24 | 8 |

[a]Average of 5 specimens injection molded. The ± values indicate 95% confidence limits. For converting to SI unit = 1 ft-lb/in = 53.3787 J/m.
[b]Energy at 50% failure of 16 tests using tester a. The nominal specimen thickness is 0.075".
[c]ABS-#2/SBC-#1 ratio = 99:1; 0.35% carbon black in final composition.
[d]Butadiene (71%)-acrylonitrile (29%) copolymer.
[e]Oil extended copolymer comprising about ⅛ mineral oil, ⅝ stryene (30%) and butadiene (70%).
[f]Stryrene (30%)-butadiene (70%) block copolymer.

EXAMPLE 4

In further operations, the use of NRBC in improving the blendability, e.g., of a high-impact strength ABS resin with a low-impact strength ABS resin (as is often done in the industry for purposes of economy) was evaluated to determine if the proportion of the low-acrylonitrile, about 7–9% rubber, balance styrene including about 1–1.5% additives). All final blends contained 0.35% carbon black and 0.325% nitrile rubber. The results of the various tests are set forth below in Table V:

TABLE V

COMPARISON OF THE IMPACT STRENGTH OF ABS-3/ABS-4 MELT-BLENDED WITH 1% CARBON BLACK CONCENTRATE OR NITRILE RUBBER CARBON BLACK CONCENTRATE

| ABS-3/ ABS-4 Ratio | Black Concentrate Type | Injection Molded Notched Izod Impact[a] (Ft-Lb/In) 73° F. | −40° F. | Compression Molded Gardner Impact[b] (In-Lb) 73° F. | −40° F. |
|---|---|---|---|---|---|
| 1. 60/40 | EBC #1 | 6.2 ± 0.2 | 1.8 ± 0.2 | 71 ± 10 | 42 ± 4 |
| 2. 50/50 | EBC #1 | 5.4 ± 0.2 | 1.6 ± 0.3 | 54 ± 6 | 31 ± 3 |
| 3. 50/50 | NRBC-#3 | 6.1 ± 0.4 | 1.6 ± 0.2 | 79 ± 5 | 43 ± 4 |
| 4. 40/60 | NRBC-#3 | 5.2 ± 0.3 | 1.7 ± 0.2 | 55 ± 4 | 31 ± 4 |

[a]Average of 5 specimens. The ± indicate 95% confidence limits. For converting to SI unit: 1 ft-lb/in = 53.3787 J/m.
[b]Energy at 50% failure of 20 specimens (30 specimens for −40° F.) tested on the Gardner tester (b). Nominal specimen dimensions: 2" × 2" × 0.15". The ± values indicate 95% confidence limits.

The foregoing data indicate that the concentration or ratio of the low impact strength ABS-4 resin in the total composition can be increased by about 10% even by the addition of a very low amount (0.325 wt. %) nitrile rubber to the composition. For example, the impact strengths of the composition of Sample No. 3 (50/50 ratio), mixed with only a very low amount (0.325%) of nitrile rubber, are comparable with those of the 60/40 resin of Sample No. 1, even though the Sample No. 3 composition contains 10% more of the low-impact ABS-4 resin. Similar results are indicated for Sample No. 4, which contains 10% more of the low-impact ABS-4 resin than the Sample No. 2 composition. As is apparent from the above, the NR addition not only overcomes the detrimental effect of carbon black evidenced in preceding examples, but also allows the blending of greater amounts of low-impact resins without substantially affecting the desired impact strength of the final blend. Blends incorporating even greater amounts of the low impact resin while maintaining the desired blend impact strength, or blends having improved impact strength, can be obtained by using increased amounts of the NR.

What is claimed is:

1. A nitrile rubber, carbon black concentrate composition comprising (1) from about 2 to about 50 weight % carbon black, (2) from about 20 to about 40 weight % of a butadiene-acrylonitrile rubbery copolymer, with the balance being essentially (3) ABS terpolymer.

2. The concentrate of claim 1 which contains from about 1 to about 6 wt. % plasticizer.

3. The concentrate of claim 1 wherein (2) is employed in amounts of from about 30 to about 40 wt. %.

4. The concentrate of claim 1 comprising from about 30 to about 35 wt. % each of components (1)–(3).

5. The concentrate of claim 1 comprising about 35 wt. % carbon black and about 32.5 wt. % each of components (2) and (3).

6. The concentrate of claim 1 wherein the rubbery copolymer comprises from about 20 to about 50 or more wt. % acrylonitrile and correspondingly from about 80 to about 50 or less wt. % butadiene.

7. The concentrate of claim 4 comprising about 35 wt. % carbon black, about 32.5 wt. % of component (2), about 4 wt. % dioctyl adipate, the balance being essentially component (3).

8. The concentrate of claim 4 wherein component (b) comprises from about 20 to about 50 or more wt. % acrylonitrile and correspondingly from about 80 to about 50 or less wt. % butadiene.

9. The concentrate of claim 5 wherein component (b) comprises from about 20 to about 50 or more wt. % acrylonitrile and correspondingly from about 80 to about 50 or less wt. % butadiene.

* * * * *

UNITED STATES PATENT AND TRADEMARK OFFICE
CERTIFICATE OF CORRECTION

PATENT NO. : 4,243,577
DATED : January 6, 1981
INVENTOR(S) : Cherry C. Chiao

It is certified that error appears in the above—identified patent and that said Letters Patent is hereby corrected as shown below:

Column 9, Table IV, Sample No. 4, under the 73°F. column, "2.435 0.2" should be -- 2.4 ± 0.2 --;

In the same Table IV, the footnote shown as "$^3$" should be -- $e$ --;

Column 10, Table V, the first footnote $^a$ after "±" the word -- values -- should be added.

Signed and Sealed this

Sixteenth Day of June 1981

[SEAL]

Attest:

RENE D. TEGTMEYER

Attesting Officer    Acting Commissioner of Patents and Trademarks